March 6, 1951  F. B. BAYLESS ET AL  2,544,212
LIQUID SEAL STUFFING BOX ASSEMBLY
AND POLISHED ROD FOR THE SAME
Filed Dec. 6, 1948

INVENTORS
F.B. BAYLESS
D.A. CHASE
BY Hudson & Young
ATTORNEYS

Patented Mar. 6, 1951

2,544,212

UNITED STATES PATENT OFFICE 2,544,212

LIQUID SEAL STUFFING BOX ASSEMBLY AND POLISHED ROD FOR THE SAME

Frederick B. Bayless and Dean A. Chase, Odessa, Tex., assignors to Phillips Petroleum Company, a corporation of Delaware Application December 6, 1948, Serial No. 63,692

8 Claims. (Cl. 286—26)

This invention relates to liquid seal stuffing box assemblies. In one specific aspect it relates to the subcombination comprising a polished rod for use at such assemblies. In another specific aspect it relates to assemblies for sealing the top of the tube so that a rod may be reciprocated therethrough to operate a pump for pumping oil in a well subject to intermittent flows of high pressure gas.

In the prior art it has been old to pack pump rods with a stuffing box but these stuffing boxes wear out rather quickly and tend to leak especially when the well pressure varies due to flows of gas into the well. The usual stuffing box cannot pack against the reciprocating pump rod in gas tight relationship without undue wear on the fabric or rubber packing material. Constant tightening and adjustment is necessary. The operator of a number of pumping wells does not like to visit the same more often than necessary and therefore often tightens each stuffing box visited each time whether the stuffing box needs tightening or not, which results in rapid wear and frequent breakdown and replacement.

The present invention avoids these difficulties of the prior art by lessening the load on the packing so that it merely acts as a liquid wiper or liquid sealing device instead of a gas-tight packer. Obviously a liquid seal need not be as tight as a gas seal. A supply of lubricant is made available at all times by means of a reservoir and this liquid lubricant acts both as a gas seal and as a means for converting the stuffing box from a gas seal to a liquid seal. At the same time this lubricating liquid lubricates the stuffing box and reduces wear on the same. The operator can be instructed to leave the stuffing box alone and to not tighten the same when he visits it unless it is leaking liquid. Once the operator finds that the stuffing box will continue to operate without constant adjustment he will leave it alone and the wear will be reduced.

One object of the present invention is to provide a better stuffing box for well pumping rods or similar packed rods.

Another object is to provide a stuffing box which only needs to have a liquid seal as the gas sealing is provided by the liquid from a reservoir.

Another object is to provide a self-lubricated stuffing box.

Another object is to provide a stuffing box assembly which is rugged, foolproof in operation, requires relatively little adjustment, has a trap for solid materials and which will operate with a minimum amount of attention.

Another object is to provide as a subcombination, a polished rod suitable for use in the stuffing boxes enumerated in each one of the above objects of the invention.

Numerous other objects and advantages will be apparent to those skilled in the art upon reading the accompanying specification, claims and drawings.

Figure 1:
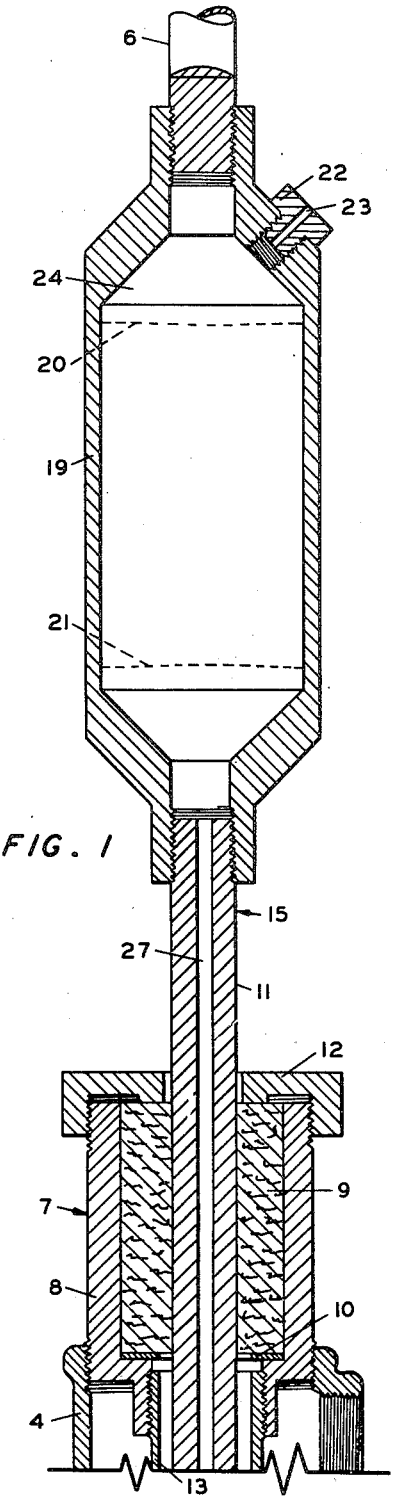
Figure 1 is an elevational view substantially entirely in cross section of the upper portion of a stuffing box assembly embodying the present invention.
Figure 2:
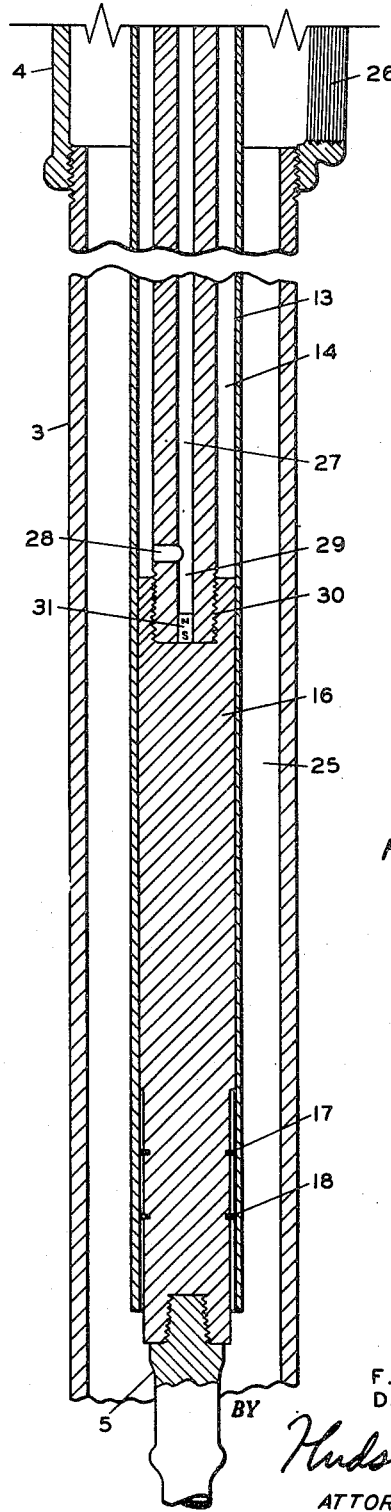
Figure 2 is a continuation of the lower portion of Figure 1 showing the lower part of the same stuffing box assembly.

While the stuffing box assembly illustrated in the drawings is adapted to seal and pack many types of reciprocating rods in various types of machines, it is particularly adapted for use in a pumping oil well, especially one having a constant or intermittent gas pressure and therefore it has been shown for purposes of illustration in connection with such a well.

Such wells are generally provided with a tubing 3. At the top of the tubing is a well head generally in the form of a standard pumping T 4. The well is being pumped by a reciprocating rod 5 known as a sucker rod. The lower end of rod 5 is attached to a load (generally a reciprocating liquid pump having a standard valve and a traveling valve, this load or pump not being shown). In order to reciprocate rod 5, a rod 6 is provided at the top of Figure 1, generally known as a hanger rod. This hanger rod may be reciprocated by any known prime mover, generally being reciprocated by a walking beam or pump jack (not shown).

The stuffing box assembly, generally designated by 7, comprises a body 8 filled with suitable packing material 9 which may be supported directly on body 8 or indirectly on a lead seal gasket or washer 10. A polished rod or packing rod 11 passes through the packing 9 and the packing may be adjusted against rod 11 in liquid-tight sealing relation by means of packing sleeve retaining nut or gland 12. Depending from the lower end of body 8 and secured thereto in liquid-tight relationship is a barrel 13. Barrel 13 is larger than rod 11, providing an annular space 14 therebetween.

The polished rod assembly generally designated by 15 comprises a reduced diameter portion 11 preferably having a highly polished exterior surface to minimize wear on packing 9, and an enlarged diameter packing plunger portion 16 which fits barrel 13 in liquid sealing relationship. This liquid seal may be perfected by the use of piston rings 17 and 18. Plunger 16 is preferably made separable from rod 11 for replacement of whichever portion wears out first. The assembly 15 also includes a liquid reservoir 19 which could be the same or less diameter than rod 15 but preferably is made considerably larger in diameter in order to reduce its longitudinal extent.

Reservoir 19 is substantially filled with a liquid (not shown) and during operation the top level of the liquid fluctuates between dotted lines 20 and 21. In the lower part of the stroke as shown in the drawings the liquid level would probably be near 21 and when plunger 16 is raised in the upper part of the stroke the liquid level would be about at line 20.

Suitable means is provided to add liquid to the reservoir such as plug 22 and in most instances, it is desirable to have a vent such as 23 to the atmosphere, but vent 23 need not be in plug 22, and vent 23 can be eliminated if the space 24 above the highest liquid level 20 is made sufficiently large to allow for compression of the gas over the liquid. A vent 23 is preferred however. The oil being pumped out of the well through tubing 3 comes up the annular space 25 between the tubing and barrel 15 and passes out through head 4 through a flow line (not shown) which is attached to head 4 by such means as screw threads 26 from which it goes to such oil and gas separators and storage tanks (none of these are shown) as desired. Polished rod 11 is provided with an internal conduit 27 which connects the reservoir 24 with the annular space 14 through a suitable port or ports 28. Port 28 allows the liquid to pass in and out of the reservoir during the pumping operation. A lower extension 29 will trap small pieces of metal, packing or other foreign solid material by gravity which may be removed during overhaul of the device by unscrewing threads 30 and blowing out conduit 27. A magnet 31 may be placed in 29 if desired, to catch bits of iron.

*Operation*

The operation of the device is self-explanatory. Hanger rod 6 is reciprocated and rod 6 being rigidly secured to rod 5 by the polished rod assembly 15, rod 5 reciprocates and operates a pump (not shown) at the bottom of the well. The oil passes up space 25 and out 26. Gas may be produced along with the oil, oftentimes intermittently. This gas ordinarily would force its way through the packing 9 unless the packing was very tight, in which case the packing would wear out quickly. In the present invention, however, reservoir 19 is full of a liquid sealing agent, which agent is also preferably a lubricant. While other liquids can be used, ordinary lubricating oil is preferred. This lubricating oil in 19 runs down conduit 27 and out hole 28 filling up space 14. Nut 12 may be loosened to relieve air or the air can be ignored as it will gradually work out through packing 9. The lubricating and sealing oil however, may moisten packing 9 but even with a loose adjustment of nut 12, it will not pass through the packing. The sealing liquid will fill space 14 and prevent the passage of gas and at the same time it will lubricate packing 9 and the barrel 13.

The sealing liquid is not lost downwardly because plunger 16 fits barrel 13 too closely to permit loss of oil and this close fit can be supplemented by piston rings 17 and 18 if desired. Gas under considerable pressure is unable to pass these piston rings and go through the oil to pass the packing 9 and, therefore, packing 9 gives a gas-tight fit although actually only liquid-tight as the liquid in 14 supplies the gas seal.

When the polished rod assembly 15 rises, plunger 16 forces the oil in space 14 into the hole 28 and back up to 27 so that the oil surface fluctuates between lines 20 and 21. The space 24 above level 20 either contains sufficient compressible gas or is vented preferably to the atmosphere through vent 23. Any bits of metal that come loose accumulate by gravity in trap 29 and if desired may be held down by a removable magnet 31.

While we have shown in the drawings one particular preferred embodiment of the invention for illustrative purposes it is obvious that modifications may be made in the same and in the various features of construction thereof without departing from the invention, the scope of which is indicated by the following claims.

Having described our invention, we claim:

1. A liquid seal stuffing box assembly for a well head comprising in combination a body, means to attach said body to a well head in liquid sealing relation therewith, a passageway in said body, a polished rod in said passageway, means on one end of said polished rod to connect the same with a prime mover, means on the opposite end of said polished rod to connect the same with a load, a reservoir adapted and disposed to contain a supply of liquid in said polished rod, packing means on said polished rod sealing against the internal surface of said passageway, sealing means in said body sealing against the exterior surface of said polished rod, said polished rod having a conduit communicating between said reservoir and the passageway in said body at a point between said packing means and said sealing means said conduit including a trap for solid materials.

2. A liquid seal stuffing box assembly comprising in combination a body, a passageway in said body, a polished rod in said passageway, means on one end of said polished rod to connect the same with a prime mover, means on the opposite end of said polished rod to connect the same with a load, a reservoir adapted and disposed to contain a supply of liquid in said polished rod, packing means on said polished rod sealing against the internal surface of said passageway, sealing means in said body sealing against the exterior surface of said polished rod, said polished rod having a conduit communicating between said reservoir and the passageway in said body at a point between said packing means and said sealing means.

3. A liquid seal assembly for well tubing comprising in combination a body, means to attach said body to the tubing of a pumping well, said body comprising a rod wiping stuffing box and a dependent barrel sealed to the lower end of the stuffing box, a polished rod having a reduced diameter portion reciprocable in said stuffing box and wiped thereby and an enlarged diameter portion reciprocable in said barrel and closely fitting the same in liquid sealing relationship, a reservoir of greater diameter than said polished rod secured to the top of the same and adapted to contain a sealing liquid, said reservoir having a vent, and means for attaching operating rods to the top of said reservoir and the bottom of said polished rod, said polished rod containing a conduit connecting said reservoir and the space between said barrel and the reduced diameter portion of said polished rod, said conduit including a gravity trap for solid materials.

4. A liquid seal assembly for well tubing comprising in combination a body, means to attach said body to the tubing of a pumping well, said body comprising a rod wiping stuffing box and a dependent barrel sealed to the lower end of the stuffing box, a polished rod having a reduced diameter portion reciprocable in said stuffing box and wiped thereby and an enlarged diameter portion reciprocable in said barrel and closely fitting the same in liquid sealing relationship, a reservoir of greater diameter than said polished rod secured to the top of the same and adapted to contain a sealing liquid, and means for attaching operating rods to the top of said reservoir and the bottom of said polished rod, said polished rod containing a conduit connecting said reservoir and the space between said barrel and the reduced diameter portion of said polished rod.

5. A polished rod for use with a stuffing box assembly, having a reduced diameter polished portion, having an enlarged diameter portion provided with piston ring sealing means at one end, and having an enlarged reservoir for liquid at the other end, said reservoir having a vent to the atmosphere, and means for attaching operating rods to said reservoir and said enlarged diameter portion, said polished rod containing a conduit connecting said reservoir and the exterior of said reduced diameter portion, said conduit including a trap for solid materials.

6. A polished rod for use with a stuffing box assembly, having a reduced diameter polished portion, having an enlarged diameter portion provided with piston ring sealing means at one end, and having an enlarged reservoir for liquid at the other end, and means for attaching operating rods to said reservoir and said enlarged diameter portion, said polished rod containing a conduit connecting said reservoir and the exterior of said reduced diameter portion, said conduit including a trap for solid materials.

7. A polished rod for use with a stuffing box assembly, having a reduced diameter polished portion, having an enlarged diameter portion provided with sealing means at one end, and having a reservoir for liquid at the other end, said reservoir having a vent to the atmosphere, and means for attaching operating rods to said reservoir and said enlarged diameter portion, said polished rod containing a conduit connecting said reservoir and the exterior of said reduced diameter portion.

8. A polished rod for use with a stuffing box assembly, having a reduced diameter polished portion, having an enlarged diameter portion provided with sealing means at one end, and having a reservoir for liquid at the other end, and means for attaching operating rods to said reservoir and said enlarged diameter portion, said polished rod containing a conduit connecting said reservoir and the exterior of said reduced diameter portion.

FREDERICK B. BAYLESS.
DEAN A. CHASE.

REFERENCES CITED

The following references are of record in the file of this patent:

UNITED STATES PATENTS

| Number | Name | Date |
|---|---|---|
| 1,503,782 | Barnes | Aug. 5, 1924 |
| 1,586,364 | Hendrickson | May 25, 1926 |
| 2,218,839 | Armstrong et al. | Oct. 22, 1940 |
| 2,333,096 | Dowty | Nov. 2, 1943 |
| 2,350,898 | Jetter | June 6, 1944 |